(12) United States Patent
Terwal

(10) Patent No.: US 9,589,052 B2
(45) Date of Patent: *Mar. 7, 2017

(54) REMOTE NODE FOR BI-DIRECTIONAL DIGITAL AUDIO DATA AND CONTROL COMMUNICATIONS

(71) Applicant: Bose Corporation, Framingham, MA (US)

(72) Inventor: Remco Terwal, West Newton, MA (US)

(73) Assignee: Bose Corporation, Framingham, MA (US)

( * ) Notice: Subject to any disclaimer, the term of this patent is extended or adjusted under 35 U.S.C. 154(b) by 350 days.

This patent is subject to a terminal disclaimer.

(21) Appl. No.: 14/076,805

(22) Filed: Nov. 11, 2013

(65) Prior Publication Data

US 2014/0067103 A1 Mar. 6, 2014

Related U.S. Application Data

(63) Continuation of application No. 12/888,535, filed on Sep. 23, 2010, now Pat. No. 8,615,091.

(51) Int. Cl.
*H04L 12/66* (2006.01)
*G06F 17/30* (2006.01)
(Continued)

(52) U.S. Cl.
CPC ........ *G06F 17/3074* (2013.01); *H04L 7/0008* (2013.01); *H04L 7/033* (2013.01);
(Continued)

(58) Field of Classification Search
USPC .......... 381/77, 80–82; 700/94; 370/463, 465
See application file for complete search history.

(56) References Cited

U.S. PATENT DOCUMENTS

2005/0113947 A1* 5/2005 LeBlanc ................. H03F 21/00 700/94
2006/0104396 A1* 5/2006 Soriano ............... G06F 13/4282 375/362

(Continued)

FOREIGN PATENT DOCUMENTS

WO 9963698 A2 12/1999
WO 0108366 A1 2/2001

OTHER PUBLICATIONS

Extended European Search Report dated Oct. 29, 2014 for Application No./Patent No. 14175945.6-1870/2806561.
(Continued)

*Primary Examiner* — Disler Paul
(74) *Attorney, Agent, or Firm* — Bose Corporation

(57) ABSTRACT

A remote node for bi-directional digital audio data and control communications includes remote components including: a remote transceiver; a remote low-voltage power supply that provides power to the other remote node components; and a sub-system that derives a master clock signal from received digital audio data. The sub-system includes a phase-locked loop (PLL) that is locked to a PLL input signal and outputs a remote node clock signal, and a switch that selects the PLL input signal from the derived clock signal and the remote node clock signal. The remote node is enabled to receive over a two-wire communication network digital audio data and digital control signals, and to transmit over the network digital control signals. The remote power supply has an input that is configured to be coupled to the network to derive the power for the remote node from power coupled to the network by a host end.

21 Claims, 3 Drawing Sheets

(51) Int. Cl.
*H04L 7/00* (2006.01)
*H04L 7/033* (2006.01)
*H04L 25/02* (2006.01)

(52) U.S. Cl.
CPC .... *H04L 25/0272* (2013.01); *H04R 2227/003* (2013.01); *H04R 2499/13* (2013.01)

(56) References Cited

U.S. PATENT DOCUMENTS

| | | | | |
|---|---|---|---|---|
| 2006/0116073 | A1* | 6/2006 | Richenstein | H04H 20/62 455/3.06 |
| 2006/0126862 | A1* | 6/2006 | Andrews | H04R 5/02 381/77 |
| 2007/0223518 | A1* | 9/2007 | Sanpitak | H04L 12/4625 370/463 |
| 2010/0290649 | A1* | 11/2010 | Hibbing | H04R 3/00 381/174 |
| 2010/0322441 | A1* | 12/2010 | Weiss | G06F 1/26 381/120 |

OTHER PUBLICATIONS

Mehrnoush Rahmani et al: "Performance analysis of different network topologies for in-vehicle audio and video communication", Telecommunication Networking Workshop on QOS in Multiservice IP Networks, 2008. IT-News 2008. 4th International, IEEE, Piscataway, NJ, USA, Feb. 13, 2008 (Feb. 13, 2008), pp. 179-184, XP031242872, ISBN: 978-1-4244-1844-2.

* cited by examiner

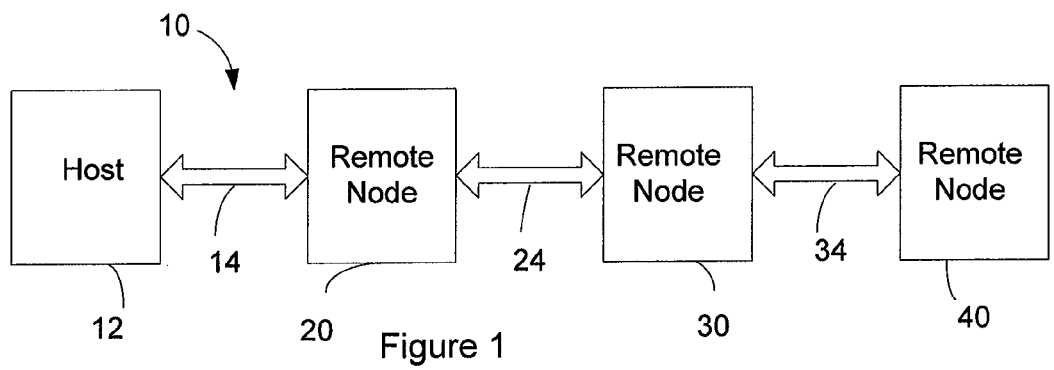
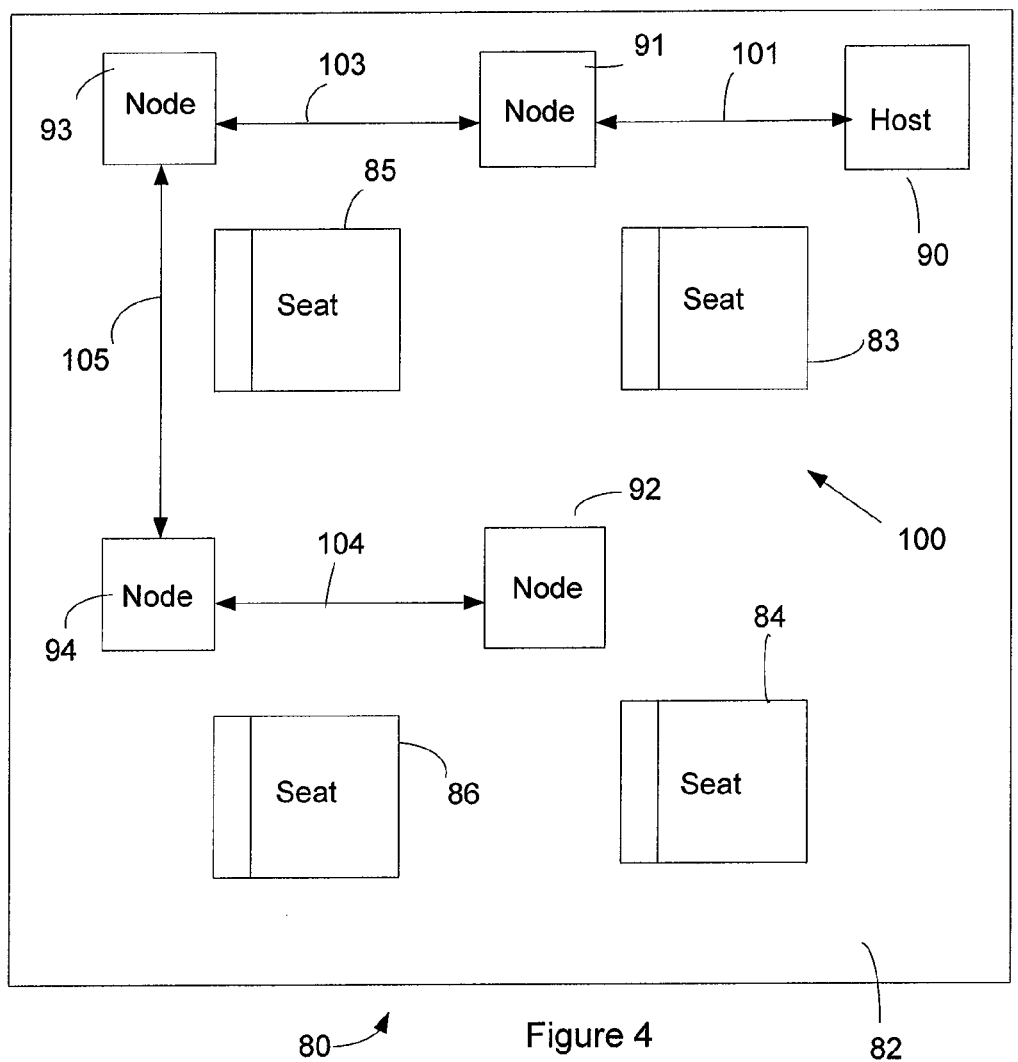

REMOTE NODE FOR BI-DIRECTIONAL DIGITAL AUDIO DATA AND CONTROL COMMUNICATIONS

CROSS-REFERENCE TO RELATED APPLICATIONS

This application is a continuation of U.S. application Ser. No. 12/888,535, filed Sep. 23, 2010, now pending, the contents of which are incorporated herein by reference.

FIELD

This disclosure relates to bi-directional digital audio data and control communications.

BACKGROUND

Motor vehicle audio systems and audio networks in motor vehicle interiors are becoming increasingly more complex. For example, each passenger space may be provided with its own audio capabilities. Further, microphones are sometimes used in vehicle cabins for purposes such as speech recognition and active noise reduction. Motor vehicle audio systems may require one to several microphones and/or an amplifier at each passenger location. These peripheral or remote nodes typically receive audio data from (and transmit audio to, when microphones are used) an audio system processing unit, such as a head unit or a separate processing and amplification unit, that is typically located elsewhere in the vehicle such as under the dash or in the trunk area. The result is that the complexity, data transfer needs and wiring requirements for vehicle audio systems have become unwieldy. For example, the audio network typically requires three wires between each microphone and the audio processing unit. The wiring alone consumes substantial valuable vehicle interior space and weight that could otherwise be devoted to other important aspects such as passenger room and comfort. Further, the audio data and control signal communication requires a complex, expensive audio data and control communications system.

SUMMARY

In general, one aspect of the invention features a remote node for bi-directional digital audio data and control communications. The remote node includes remote components which include a remote transceiver, and a remote low-voltage power supply that provides power to the other remote node components. The remote components also include a sub-system that derives a master clock signal from received digital audio data. The sub-system includes a phase-locked loop (PLL) that is locked to a PLL input signal and outputs a remote node clock signal. The sub-system also includes a switch that selects the PLL input signal. The switch selects from the derived clock signal and the remote node clock signal. The remote node is configured to connect to a host end and to one or more other remote nodes via a two-wire communication network. The remote node is enabled to receive over the two-wire communication network digital audio data and digital control signals, and is enabled to transmit over the two-wire communication network digital control signals. The remote power supply has an input that is configured to be coupled to the two-wire communication network to derive the power for the remote node from power coupled to the network by the host end.

Implementations may include one of the following features, or any combination thereof. The remote nodes may include amplifiers. The remote nodes may include a first LVDS driver/receiver and a second LVDS driver/receiver. The remote node may include a remote microcontroller. The remote components may include an audio sink such as a loudspeaker and/or an audio source such as microphone (which may be digital microphone) or a line input. The switch may select the derived clock signal while forward data is being received by the remote node, and select the remote node clock signal while return data is being sent by the remote node.

In general, in another aspect the invention features a remote node for bi-directional digital audio data and control communications in a vehicle interior. The remote node includes remote components which include a remote transceiver, first and second low voltage differential signaling (LVDS) drivers/receivers, and a remote low-voltage power supply that provides power to the other remote node components. The remote node is configured to connect to a host end and to one or more other remote nodes via a shielded two-wire communication network that carries LVDS signals. The remote power supply has an input that is configured to be coupled to the communication network via a signal isolator to derive the power for the remote node from power coupled to the network by the host end.

Implementations may include one of the above features, or any combination thereof.

BRIEF DESCRIPTION OF THE DRAWINGS

FIG. 1 is a schematic block diagram of a system for accomplishing bi-directional digital audio data and control communications;

FIG. 4 is a block diagram of a vehicle interior illustrating one application of the system for accomplishing bi-directional digital audio data and control communications.

DETAILED DESCRIPTION

Figure 2:
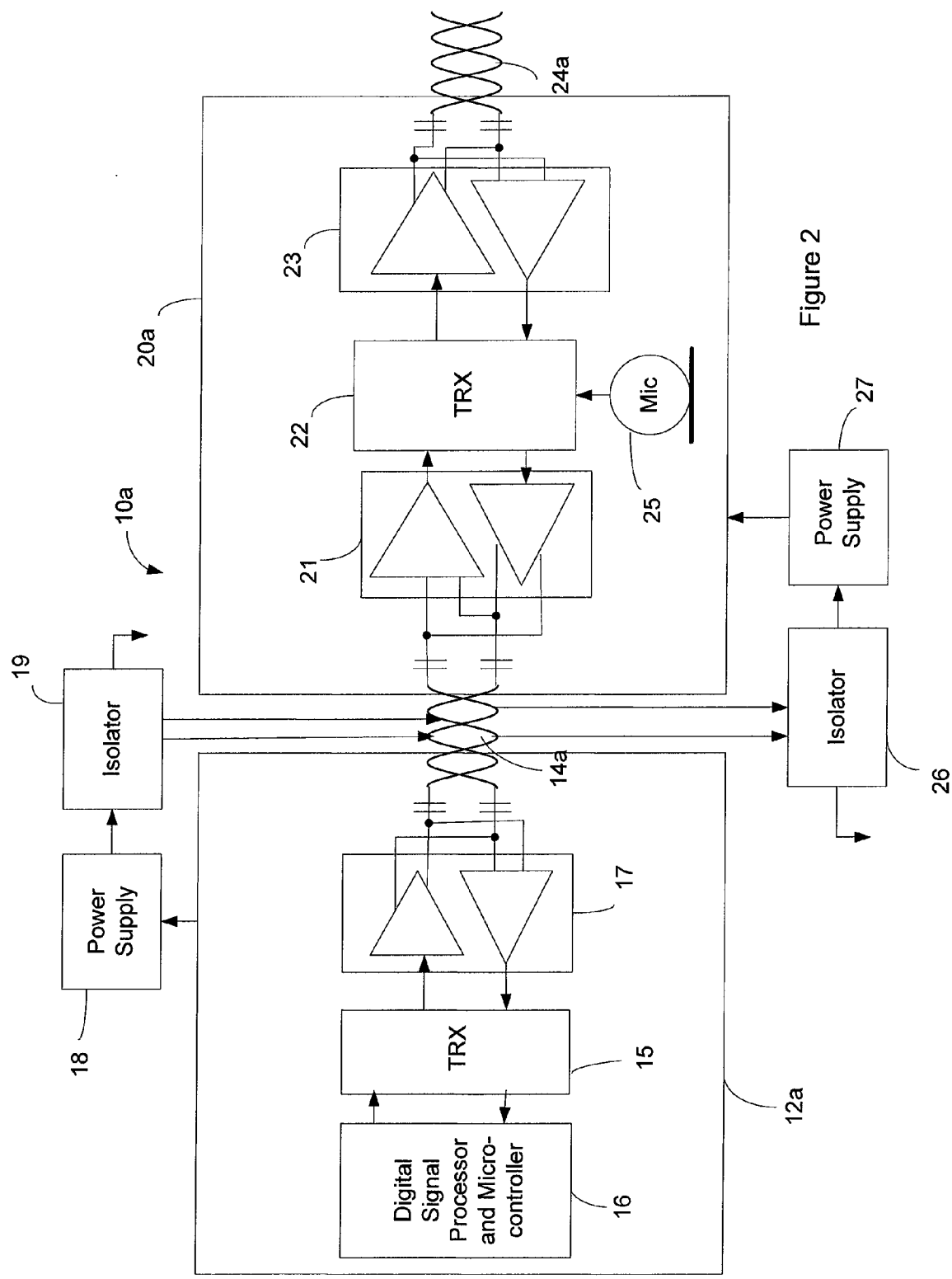
FIG. 2 is a more detailed diagram of portions of an embodiment of a system for accomplishing bi-directional digital audio data and control communications that includes remote microphones.

This disclosure is related to a bi-directional digital audio data and control communications system. The system can be used in situations in which audio systems require or could benefit from bi-directional flow of audio data and/or control signals. One example is a vehicle audio system. Another example is a telephone conferencing system in which a number of microphones and/or speakers are in use.

The system may have an amplifier at the host end, which may be at the audio head unit or a separate audio processing unit for a motor vehicle in the embodiment for use in motor vehicles. A number of remote nodes are supported. For use in a motor vehicle, the remote nodes can be but need not be associated with a passenger location. The remote nodes can include an amplifier and/or one or more microphones, or other devices that act as audio sources or sinks. Microphones may be situated such that they sense sound at particular locations in a vehicle cabin. In certain non-limiting examples, the system can be used as part of a cabin voice recognition system, a cabin active noise reduction system, a cabin speech/conversation enhancement system and/or an audio system with separate amplifiers and speakers for a number of passenger locations.

FIG. 1 shows system 10 for accomplishing bi-directional digital audio data and control communications. In one non-limiting embodiment, system 10 may be used as part of the audio system for a vehicle interior. System 10 includes a host end 12 that communicates with a plurality of remote nodes 20, 30 and 40. Host 12 may comprise an amplifier. System 10 is adapted and arranged to communicate digital audio data and digital control and status communications in both directions between host 12 and each of the remote nodes. The remote nodes may include one or more audio sources and/or sinks, such as microphones, amplifiers, or other devices.

The communications network that interconnects the components comprises shielded two-wire network wiring that includes portion 14 that connects host 12 to remote node 20. The remote nodes are connected in a daisy chain configuration in which each node is connected to one or two other nodes as indicated by shielded two-wire bi-directional network wiring portions 24 and 34. Remote node 40 could also be connected to remote node 20 for bi-directional communication. The network is configured and arranged to communicate digital audio data and/or digital control signals in both directions between the host end and the remote nodes. Each remote node is dynamically provided with a unique address, such that all hardware nodes can be built the same. Each remote node includes a transceiver. As a result, data and control signals initiated by host 12 can be passed through one or more of the remote nodes before reaching their destination node. Likewise, audio data (e.g., microphone output or line input), and control communications such as status and error signals can be communicated from any one of the remote nodes to host 12 along the daisy chain configuration, whether directly or through one or more intervening remote nodes.

The arrangement and functionality of the components of system 10 allows a vehicle audio system to be accomplished with only a shielded twisted pair of wires as the network wiring. The digital signaling (both the audio data and any control signals) transmitted over the two-wire network preferably is transmitted using low voltage differential signaling (LVDS). LVDS supports high speed digital signaling over a twisted pair. In the present system, these same wires carry low-voltage DC power superimposed on the data transmission lines. Thus the power supply and data network is accomplished with a single shielded twisted pair. Further, the daisy chain configuration means that there is only a single shielded twisted pair of wires between the audio head unit and one of the remote nodes (which can be the physically closest remote node), and a single shielded twisted pair of wires between each of the remote nodes and one or two other remote nodes. The wiring of the system thus occupies minimal space in the vehicle body, and the cost and weight of the wiring is substantially reduced. Further, the two-wire network allows the use of smaller and less expensive components with substantially reduced pin counts (only three pins are needed for the shielded twisted pair at each termination) which also decreases the physical space that needs to be devoted to the system: this is particularly meaningful for remote nodes that are located in a vehicle cabin. For example, regardless of the number of microphones or other sinks or sources used in the system, the host amplifier only needs three pins to terminate the network. In contrast, existing systems need two or three terminations per microphone. The system thus results in a host amplifier pin count reduction of at least (N×2)−3, where N equals the number of microphones. System 10 supports the use of analog or digital microphones as part of one or more of the remote nodes. When digital microphones are used, the node does not require an analog to digital converter, which further decreases the space requirements and cost. Also, the host amplifier can be the single access point to one or more high level networks at the same time (such as CAN, MOST, E-Net, etc.) without the need for the remote nodes to duplicate all the connections and associated hardware needed for high-level networks. The system thus accomplishes cost effective distributed amplifier systems with minimal network overhead.

FIG. 2 is a more detailed diagram of portions of one embodiment of system for accomplishing bi-directional digital audio data and control communications 10a. In this embodiment, host end 12a includes transceiver 15, digital signal processor and microcontroller 16, and LVDS driver/receiver 17. The power for the remote nodes is provided over the two-wire bi-directional network comprised of shielded twisted pair 14a that connects host end 12a to remote node 20a, and shielded twisted pair 24a that connects remote node 20a to the next node in the daisy chain, and further shielded twisted pair connections between additional remote nodes that can be included in the system but are not shown in FIG. 2 (the shielding is not shown in the drawing for the sake of clarity). Each remote node (e.g., 20a) includes a first LVDS driver/receiver 21, a transceiver 22 and a second LVDS driver/receiver 23. All of the remote nodes can be built with the same hardware, which further simplifies the system design. The remote nodes may also include an amplifier and/or one or more analog or digital audio sinks or sources. Embodiment 10a illustrates one non-limiting embodiment in which remote node 20a includes digital microphone 25. As the network is extremely simple, small, low-cost microphones can be used. If the microphone or other source is digital, the node does not require an analog to digital converter. When an analog microphone or other analog source or sink is present, an appropriate analog to digital converter (or D/A converter as appropriate) would be included in such remote node.

The transceivers can be accomplished with a field programmable gate array (FPGA) or an ASIC or custom IC. The LVDS drivers/receivers can be accomplished with an LVDS interface such as the National Semiconductor™ DS90LV019. Alternatively, an ASIC or custom IC can accomplish the functionality of both the transceiver and the LVDS driver/receiver. DSP 16 can be the source of the audio data if the network involves audio data flow from the host amplifier (node) to one or more remote nodes; the same goes for control data. The DSP can also accept audio data from one or more remote nodes. The host can also receive control data. The remote node may have to request control data first or receive an interrupt via the GPIO pin(s) that are used for this purpose. The GPIO pins can be used for simple point to point communication. An advantage is the low latency through the links, e.g., 1 frame time-length, 1/44100=22 us. This makes such pins especially suitable for fast error signaling and interrupts to the host system. The use of interrupts for I2C style communication is not required but an option. The power supply on the host powers the DSP, micro-controller, LVDS driver/receiver and all other components of the host. The remote nodes are also supplied with power from the host amplifier power supply, as further explained below.

Audio functionality can be present in one or more of the remote nodes. This functionality can be any audio source(s) or sink(s); audio amplifiers and microphones are specific non-limiting examples of such. Another example of a source is a ⅛" jack adapter at a remote node that allows the connection of a personal audio device, such as an iPhone® from Apple Computer.

Each of the remote nodes derives its power from the shielded two-wire communication network. This can be accomplished in the embodiment by coupling host end low voltage (e.g., lower than 6.5V) power supply 18 to twisted pair 14*a* via signal isolator 19. Remote node power supply 27 is coupled to the two-wire network via signal isolator 26 so that the remote node derives all of its power from the network. The host power supply is thus able to provide low voltage power to all of the components of all of the remote nodes. The shielding for the twisted pair is used as the common current return for the supply that is symmetrically transported over the two LVDS wires. Since the LVDS signals operate at a high speed, an impedance network or filter is employed to allow DC current to flow through while at the same time allowing the LVDS drivers to signal as if the DC was not present. In order to preserve common mode rejection on the LVDS data, the filters (e.g., signal isolators 19 and 26) are symmetric. Current 'conventional/standard' microphone solutions, utilizing electret biased microphones, require at least 8-9V in bias voltage to operate properly. Start/Stop-type vehicles crank the engine every time the car starts moving. An engine start causes a voltage dip on the battery power bus, typically from 12V down to about 6.5V, which is insufficient for conventional microphone systems. The system working at less than 6.5V can use MEMS digital microphones which can operate down to 1.8V. Hence, voltage dropouts as a result of start/stop functionality are not an issue in the system.

The network and components are preferably configured and adapted to communicate digital audio data and digital control communications in both directions. The communication scheme supports the daisy-chain arrangement. Accordingly, each node has a unique network address. Further, the communication scheme accounts for audio data and control signals being transmitted from host end 12*a* to any of the remote nodes, and audio data (if present), control signals and any other signals such as error signals being communicated back from any or all of the remote nodes to the host end. When a remote node contains an audio sink and not an audio source, for example when it contains an amplifier chip, there will be no audio data transported back from this node to the host amplifier. However, if the remote node contains an audio source (such as a microphone, line input, etc.) then audio may be transported back to the host, which happens at the same time as transporting audio from the host to the remote node.

The bi-directional digital audio data and control signal communication can be accomplished in one non-limiting embodiment by transmitting the audio data and control signals in discrete frames. The data frame between nodes can be built up out of a 'forward portion' and a 'return portion.' Each portion can include one or more sync bits, one or more audio bits, one or more control bits and one or more CRC bits. In one non-limiting example, the frame size is fixed. A number of bits of each frame are reserved for audio data. A number of additional bits of each frame are reserved for control signals and/or error signals. Also, the digital control element of the connection is an implicit form of diagnostics, so no external multiplexing and sensing is needed. The embedded bidirectional audio and control element of the connection allows for full remote node diagnostics and control, which has not been accomplished to date without the use of an expensive media network such as MOST, Ethernet or IEEE 1394.

In one non-limiting example, each frame (or each forward and return frame portion) can include 32 bit slots. Typically 20 or 24 bits are needed for digital audio data. This leaves a number of bits that can be devoted to control and error signals. Time division multiplexing can be used. Alternate frames (or, different portions of each frame) can travel in opposite directions, from and to the host end. Each of the remote nodes can be assigned a particular time slot, to allow for bi-directional communications between the host end and each of the remote nodes. As an alternative to TDM, the link can be run at a higher rate than the data clock to provide time for control and error signal communication.

The network timing is preferably derived from a master clock signal that is outputted by DSP 16 or any other clock reference. DSP 16 typically inputs and outputs the audio data as multiple parallel streams of TDM data, which is then serialized by the host transceiver. Audio data and other signals such as control and error signals are encoded via any appropriate technique, one non-limiting example being Manchester encoding. Manchester encoding allows the master clock signal to be derived from the encoded data by each of the remote nodes. In one non-limiting embodiment the control signals are inter-integrated circuit (I2C) communications. In one non-limiting embodiment the transceivers each define general purpose input/output (GPIO) pins and there is a 1:1 pin correspondence between the host and each of the remote nodes, in either direction. The pins can be hard-coded or configurable from the host.

In one non-limiting embodiment, the remote transceivers can accomplish the power control and sequencing required by the system for accomplishing the bi-directional digital audio data and control communications and power delivery over the twisted pair. The transceivers can be accomplished with an FPGA such as the IGLOO® or the ProASIC®3 Nano available from Actel Corporation, Mountain View Calif. If the remote transceivers cannot handle this functionality, a small microcontroller (not shown) may be included in the remote nodes. In this case, the remote transceiver is a local slave to the microcontroller master. In the I2C scheme, the host microcontroller is always the master and therefore the remote transceivers are each slaves, but the slaves are 'proxy masters.' When a microcontroller is present in the remote nodes and the remote transceiver is an I2C slave the registers of the remote transceivers are read locally as well as over the digital link by the host. To support data transmission from the remote nodes to the host, which happens asynchronously relative to the digital link and audio clocks, RAM buffering (not shown) may need to be included in the remote nodes as a means to collect message information before it is transported.

Figure 3:
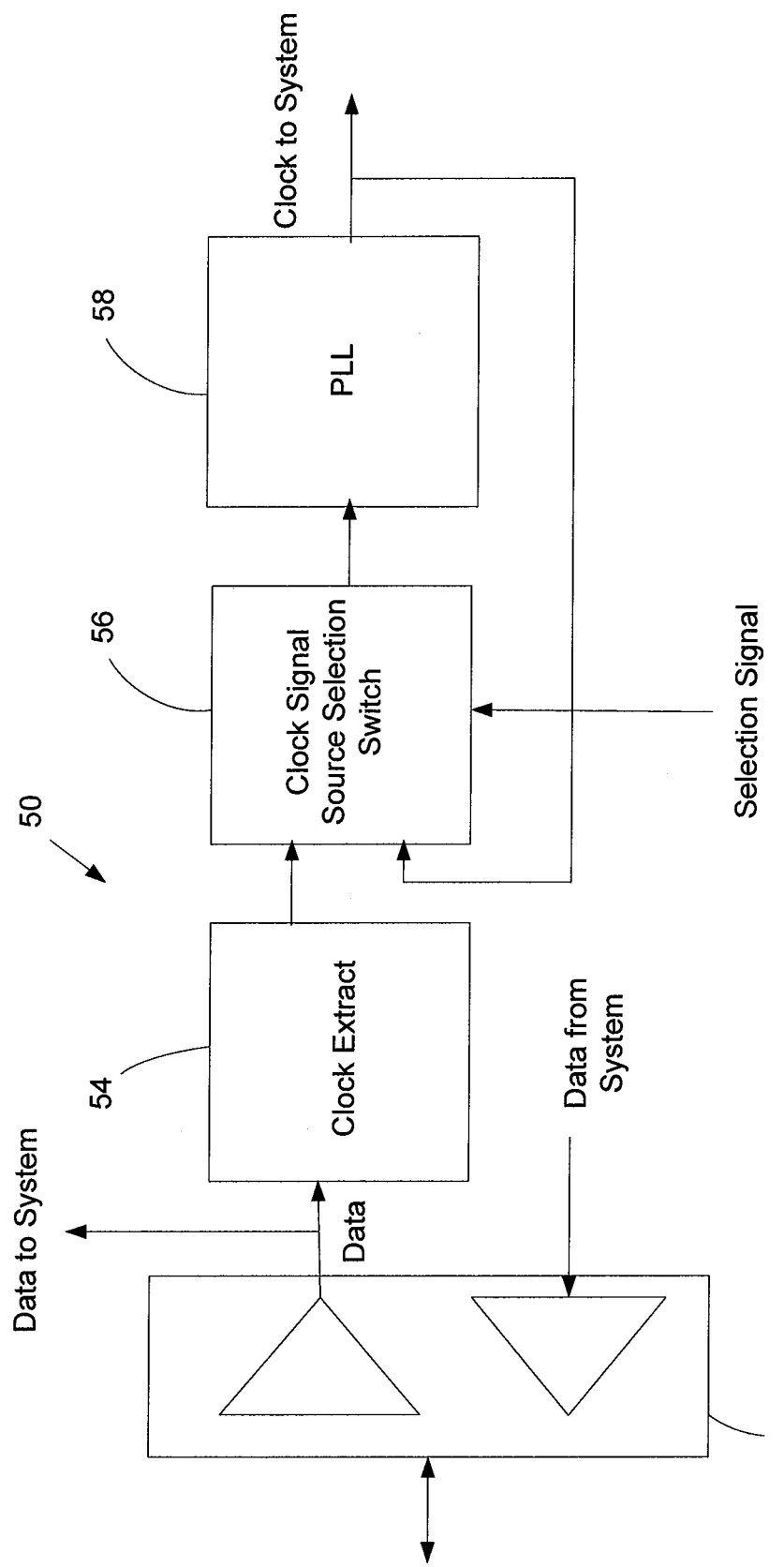
FIG. 3 is a schematic block diagram of a sub-system that can be used to achieve synchronous bi-directional communication.

In one non-limiting embodiment, remote node sub-system 50, FIG. 3, is used to help achieve synchronous bi-directional communication. Each data frame includes a forward data portion in which data is sent from the host to a remote node, and a return data portion in which data is returned from that remote node to the host. During the forward portion data is sent between the host or previous remote node and the next remote node. The next remote node receives this data into LVDS driver/receiver 52 and extracts (derives) the clock information from the data using clock extract 54. PLL 58 is then locked to the extracted clock information. As a result, the two communicating nodes operate synchronously. During the return data portion in which data is sent back from the receiving node, the node that is sending data would lose its clock reference as it is no longer receiving data from which it derives the clock. PLL 58 for this purpose is first locked to itself: it detaches from the input data stream and feeds the clock reference it produces itself to its own input, as controlled by selection switch functionality 56. The control of switching functionality 56 can be accomplished with a counter that runs within the transceiver. This counter can be set for a fixed amount of counts within the frame to reach the direction switch points. This counter can be configurable to accommodate changes in the size of the forward and backward channel data. For a short duration of time, the clock rate produced by the PLL will stay very close to the network rate, and the system will use the PLL for this short duration to signal data back to the receiving node near synchronously without any data corruption. If for some reason the portion of return data is too long for the PLL to remain stable enough during the return communication, an external PLL can be used, or a local oscillator could be included in order to achieve synchronous operation.

FIG. 4 is a highly schematic view of interior 82 of vehicle 80. Interior 82 includes a number of passenger seating locations (e.g., seats 83-86). Host end 90 of system 100 communicates digitally over a shielded twisted pair connected between it and remote nodes 91-94, each physically associated with one of locations 83-86. For example, host 90 communicates directly with node 91 over twisted pair 101, and nodes 91-94 are interconnected in a daisy-chain configuration via twisted pairs 103-105. Remote nodes 91-94 can include an amplifier or other analog or digital audio sink and/or one or more analog or digital microphones or other audio sources. This system enables remote nodes that are physically small and relatively inexpensive and requires only a single shielded twisted pair to accomplish the network that connects the components in a daisy chain configuration, and with remote node power provided by the host. System 100 can thus be used to support vehicle interior audio system functionalities, including but not limited to separate listening zones, separate speech enhancement zones and/or active noise reduction in separate zones, e.g., one zone for each occupant location.

Other implementations are within the scope of the following claims.

The invention claimed is:

1. A remote node for bi-directional digital audio data and control communications, the remote node comprising:
   remote components that comprise a remote transceiver, and a remote low-voltage power supply that provides power to the other remote node components;
   wherein the remote node is configured to connect to a host end and to one or more other remote nodes via a two-wire communication network comprising twisted wire pairs;
   wherein each twisted wire pair forms a respective data transmission line (1) for carrying bi-directional digital audio data and digital control signals, and (2) upon which low voltage power is superimposed;
   wherein the remote node is enabled to receive over the two-wire communication network digital audio data and digital control signals, and is enabled to transmit over the two-wire communication network digital control signals; and
   wherein the remote power supply has an input that is configured to be coupled to the two-wire communication network to derive the power for the remote node from power coupled to the network by the host end.

2. The remote node of claim 1 comprising an amplifier.

3. The remote node of claim 1 wherein the remote components further comprise one or more audio sources.

4. The remote node of claim 3 wherein the audio sources comprise one or more microphones.

5. The remote node of claim 4 wherein the microphones are digital.

6. The remote node of claim 1 wherein the remote components further comprise a first LVDS driver/receiver and a second LVDS driver/receiver.

7. The remote node of claim 1 further comprising a remote microcontroller.

8. The remote node of claim 1 wherein the remote components further comprise one or more audio sinks.

9. The remote node of claim 8 wherein the audio sinks comprise one or more speakers.

10. The remote node of claim 1 wherein a switch selects a derived clock signal while forward data is being received by the remote node, and selects a remote node clock signal while return data is being sent by the remote node.

11. The remote node of claim 1, wherein the remote components further comprise a sub-system that derives a master clock signal from received digital audio data, wherein the sub-system comprises a phase-locked loop (PLL) that is locked to a PLL input signal and outputs a remote node clock signal, wherein the sub-system further comprises a switch that selects the PLL input signal and wherein the switch selects from the derived clock signal and the remote node clock signal.

12. A remote node for bi-directional digital audio data and control communications in a vehicle interior, comprising:
   remote components that comprise a remote transceiver, first and second low voltage differential signaling (LVDS) drivers/receivers, and a remote low-voltage power supply that provides power to the other remote node components;
   wherein the remote node is configured to connect to a host end and to one or more other remote nodes via a two-wire communication network comprising twisted wire pairs, wherein each twisted wire pair forms a respective data transmission line (1) for carrying LVDS signals, and (2) upon which low voltage power is superimposed; and
   wherein the remote power supply has an input that is configured to be coupled to the communication network via a signal isolator to derive the power for the remote node from power coupled to the network by the host end.

13. The remote node of claim 12 wherein the remote components further comprise a sub-system that derives a master clock signal from received digital audio data, the sub-system comprising a phase locked loop (PLL) that is locked to a PLL input signal and outputs a remote node clock signal, and a switch that selects the PLL input signal from the derived clock signal and the remote node clock signal.

14. The remote node of claim 13, wherein the switch selects the derived clock signal while forward data is being received by the remote node and selects the remote node clock signal while return data is being sent by the remote node.

15. The remote node of claim 12 comprising an amplifier.

16. The remote node of claim 12 wherein the remote components further comprise one or more audio sources.

17. The remote node of claim 16 wherein the audio sources comprise one or more microphones.

18. The remote node of claim 17 wherein the microphones are digital.

19. The remote node of claim 12 further comprising a remote microcontroller.

20. The remote node of claim 12 wherein the remote components further comprise one or more audio sinks.

21. The remote node of claim 20 wherein the audio sinks comprise one or more speakers.

* * * * *